No. 715,823. Patented Dec. 16, 1902.
A. LIETZ.
TRANSIT.
(Application filed May 21, 1901.)
(No Model.)
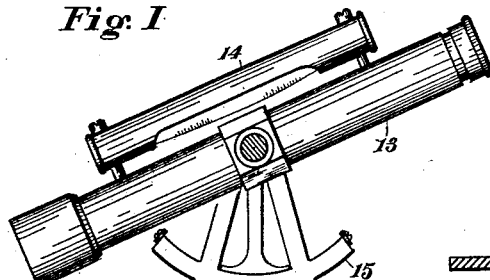
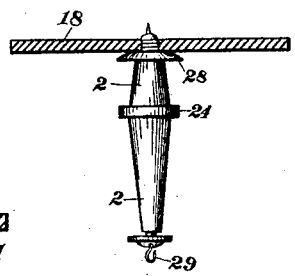
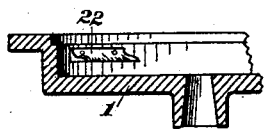
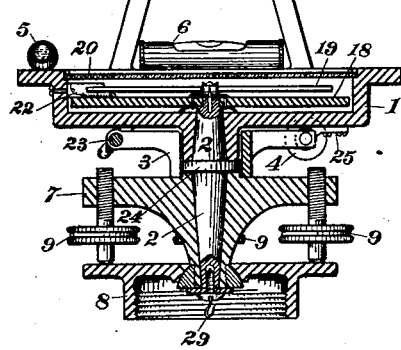
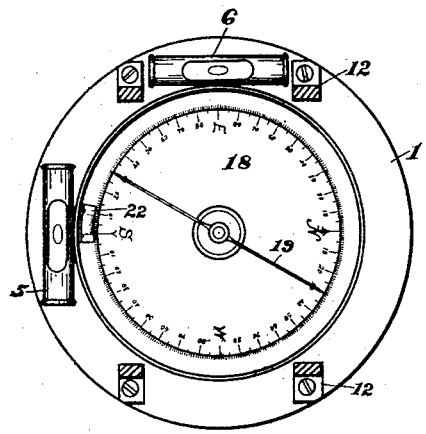
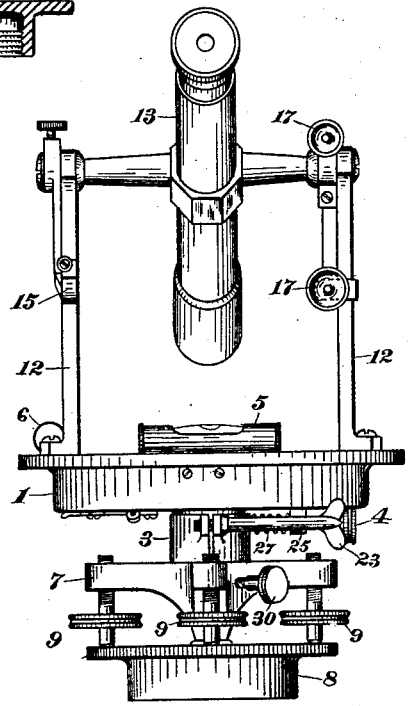
WITNESSES:
P. W. J. Lander,
Elmer Wickes.
INVENTOR
Adolph Lietz
BY
J. Richards & Co.
ATTORNEYS.
THE NORRIS PETERS CO., PHOTO-LITHO., WASHINGTON, D. C.

UNITED STATES PATENT OFFICE.

ADOLPH LIETZ, OF SAN FRANCISCO, CALIFORNIA.

TRANSIT.

SPECIFICATION forming part of Letters Patent No. 715,823, dated December 16, 1902.

Application filed May 21, 1901. Serial No. 61,224. (No model.)

*To all whom it may concern:*

Be it known that I, ADOLPH LIETZ, a citizen of the United States of America, residing at San Francisco, county of San Francisco, and State of California, have invented certain new and useful Improvements in Transits; and I hereby declare the following to be a full, clear, and exact description of the same, reference being had to the accompanying drawings, forming a part of this specification.

My invention relates to what are called "preliminary transits" and to certain improvements in these instruments whereby they are simplified in construction and in use.
My improvements consist in the employment of a single horizontal scale for both angle and needle readings, a vernier being provided to indicate fractional parts of readings on the main scale, which latter can be subdivided into degrees or multiples of these, a pivoted telescope with a scale for vertical arc, and other essential parts, as will be hereinafter more particularly explained, and illustrated in the drawings herewith, forming a part of this specification.

The object of my invention is to provide an instrument with single horizontal scale, of a simple construction, light weight, and not liable to injury or derangement in making preliminary surveys, reconnaissance, and exploration, also for permanent work within a fair degree of accuracy.

Referring to the drawings, Figure I is a side elevation, partially in section, of a transit constructed according to my invention. Fig. II is an elevation of the same instrument at a right angle to Fig. I. Fig. III is a plan view of the same instrument with the telescope and its supports omitted. Fig. IV is a partial section through the compass-box, showing the vernier-scale; and Fig. V is a detail of Fig. I, showing the central spindle and the compass-plate or scale in section.

An essential feature of my invention consists in a combination, arrangement, and operation of parts whereby a single horizontal scale or compass-plate, in combination with a sighting means, is made available for both angle and needle readings or for course and meridian.

The compass-box 1 is of the usual construction, except that it is destitute of the usual scale of graduations, and is mounted loosely on the spindle 2, so as to be adjusted thereon by the clamp 3 and adjusting-screw 4, and is provided with spirit-levels 5 and 6 for adjustment in a horizontal plane. The spindle 2 fits into a tapering seat in the adjustable support 7 and when required is held from turning therein by a common set-screw 30, that bears against the side of the spindle 2. This member 7 is pivotally supported in the tripod member 8 and adjustable at four points by means of screws 9 in the usual manner. Mounted on the compass-box 1 are standards 12, supporting the pivoted telescope 13, provided with a spirit-level 14 and a scale 15, with adjusting mechanism 17 for vertical arc in the usual manner.

The compass-plate or circular scale 18 instead of being graduated on the compass-box is rigidly mounted on top of the spindle 2 and is divided into degrees or multiples of degrees as its diameter may admit and as shown in Fig. III, and above this plate is pivoted the magnetic needle 19, protected by a glass covering 20 in the usual manner.

At one side of the compass-box 1 is fixed a short vernier-scale 22, divided to a degree of accuracy as fine as the required work may demand, usually to from one to five minutes of arc. This arc is an important feature of my invention, as will be presently explained.

The clamp 3 is of the common construction, closed by the screw 23 to nip the collar 24 on the spindle 2 and at the other end arranged to receive the adjusting-screw 4, that has a bearing 25 attached to the compass-box 1 and a spring 27 to prevent lost motion in the usual manner.

Under the compass-plate 18 is placed an elastic curved washer 28, that confines the compass-box 1 to its seat on the spindle 2, so that no derangement will occur if the instrument is lifted by the compass-box or its attachments.

The member 8 is arranged to be fastened to a common tripod by a screwed joint or in any other suitable manner, a perforation being provided for a plumb-line attached to the hook 29, concentric with the axis of the spindle 2.

The operations are as follows: For magnetic bearings or horizontal angles by the exclusive use of the magnetic needle, the instrument being set and leveled in the usual manner, the spindle 2 is clamped by screw 30. The compass-box 1 is now released by unclamping collar 3 by means of screw 23. Then the vernier 22, which is a permanent member of compass-box 1, will be moved either east or west on the graduated scale 18 to an amount equal to the magnetic variation at the place of observation. It will then be secured by the clamp-screw 23 and finely set by tangent-screw 4. By now releasing set-screw 30 the instrument can be moved in azimuth, and if the telescope 13 is directed to any object the needle 19 on the graduated scale 18 will read the magnetic bearing of that object, from which any desired angle in azimuth may again be read by orienting the telescope by means of needle 19 over the graduated scale 18.

The following instructions explain the manner of operating: For reading horizontal angles by means of the telescope 13 and the graduated scale 18 and vernier 22 independent of the magnetic needle 19 the instrument is set and leveled in the usual manner. The vernier 22 is set at zero on the scale 18. The compass-box 1 is then clamped to the spindle 2 by means of the screw 23 and clamp 3, and the spindle is clamped in the member 7 by means of the set-screw 30. The compass-box 1 is then adjusted by the tangent-screw 4, the spindle 2 is loosened in the member 7 by means of the set-screw 30, the telescope 13 is set on the object, the set-screw 30 again fastened and the clamp-screw 23 loosened, and the scale 18 adjusted by means of the tangent-screw 4, when the reading on the vernier 22 on the plate 18 will indicate the angle between the first and second objects. In this manner it will be seen that by a new combination of parts and their rearrangement I provide in a simple form and in small space an instrument with the functions of a transit for reading angles and a magnetic compass to determine courses capable of either use by simple adjustments, the results in each case being read from the same scale, and a vernier to supply fractional parts thereof.

Having thus described my invention, its nature, objects, and manner of use, what I claim as new, and desire to secure by Letters Patent, is—

1. In a transit, a single horizontal graduated plate mounted on a central spindle, a magnetic needle mounted above said plate and reading on its graduations in all positions of the plate, a compass-box surrounding and inclosing said plate at the bottom and sides but open at the top, whereby the graduations are all simultaneously exposed to view, said compass-box being movable independently of said plate, a vernier-scale attached to said compass-box and reading on said graduated plate, and a sighting means mounted on and moving with said compass-box, substantially as specified.

2. In a surveying instrument, a horizontal graduated plate mounted on a central spindle, a magnetic needle mounted above said plate and reading on its graduations in all positions of the plate, a compass-box surrounding and inclosing said plate at the bottom and sides, but open at the top, whereby the graduations are all simultaneously exposed to view, said compass-box being movable independently of said plate, an index-mark attached to said compass-box and reading on said graduated plate, and a sighting means mounted on and moving with said compass-box, substantially as specified.

In testimony whereof I have signed my name to this specification in the presence of two subscribing witnesses.

ADOLPH LIETZ.

Witnesses:
BESSE LEWIN,
ADOLPH GREUB.